United States Patent Office 3,437,990
Patented Apr. 8, 1969

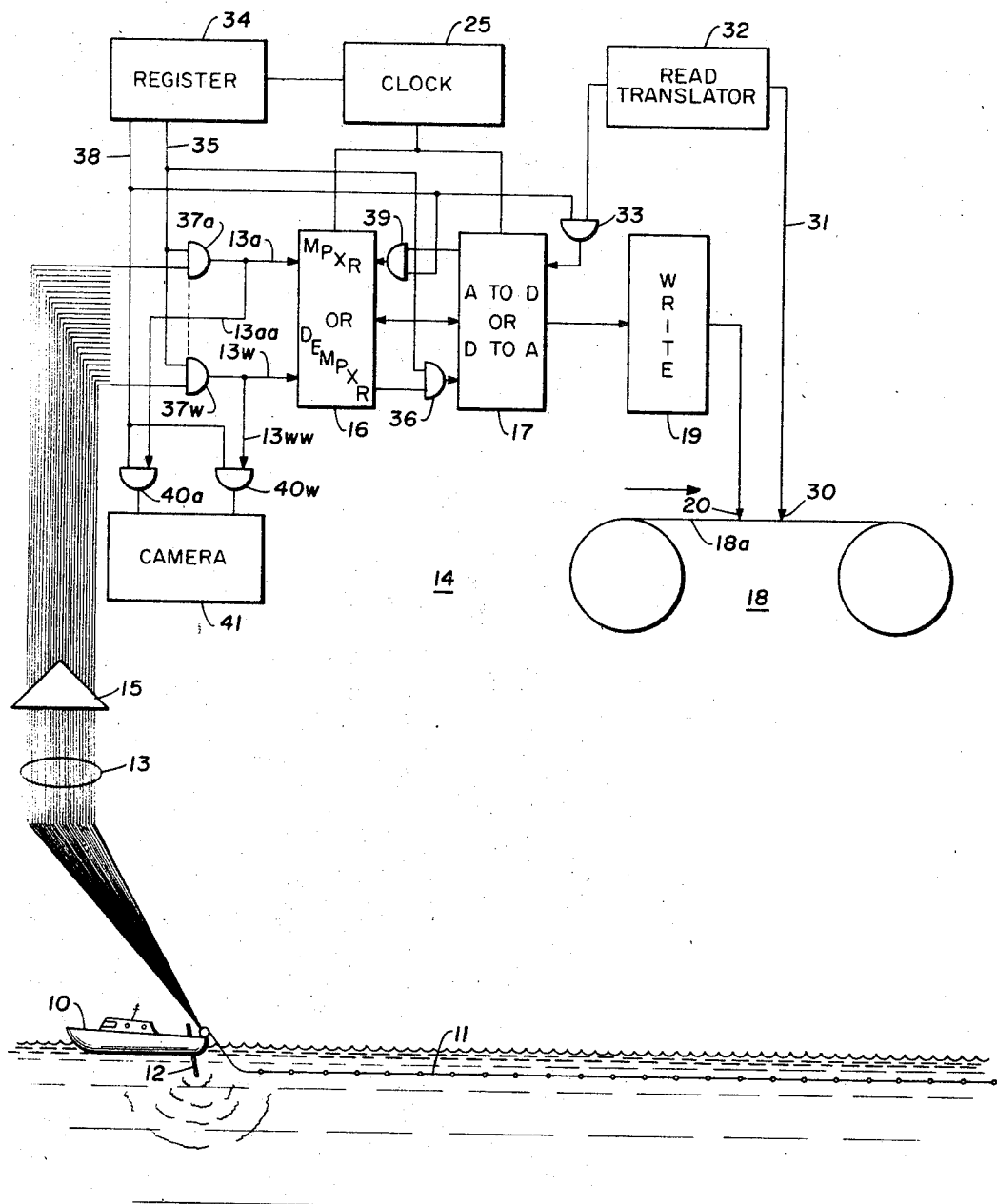

3,437,990
READ AFTER WRITE DIGITAL FIELD SYSTEM MONITOR
Edwin B. Neitzel, Dallas, Tex., assignor to Texas Instruments Incorporated, Dallas, Tex., a corporation of Delaware
Filed Dec. 30, 1966, Ser. No. 606,076
Int. Cl. G01v 1/38
U.S. Cl. 340—15.5                                   5 Claims

ABSTRACT OF THE DISCLOSURE

In seismic exploration, seismic signals are digitized and stored on magnetic tape in a field operation. A circuit is provided for reading the data recorded on the magnetic tape concurrently with recording by passing the data through the same converter and multiplexer as employed for the initial recording for monitoring the magnetic tape.

Field of the invention

This invention relates to seismic exploration and more particularly to monitoring digitized seismic data recorded on magnetic tape for play-back and data processing purposes and thereby to provide an immediate check on the initial recording process by utilizing the same multiplexing and D/A converter systems employed for the recording itself.

Prior art

In seismic exploration the seismic signals are detected in a seismic spread following each of a plurality of successive shots and are digitized and stored on magnetic tape for further processing. It has been the practice to utilize the system in a record mode wherein the seismic signals are applied to a multiplexer whose output is applied by way of an analog-to-digital converter to a magnetic tape recorder. Following the recording of the signals from each shot the system is then switched into a play-back mode wherein the data recorded on the magnetic tape is passed through the converter wherein the digital signals are converted to analog signals and then through a demultiplexing operation through a camera for making a monitor record thereby to verify the recording of the data on the magnetic tape. Such an operation is illustrated in FIGURE 1 of U.S. Patent 3,134,957 to Foote et al.

In high data volume operations of the type illustrated and described in U.S. Patent 3,034,593 to Summers, insufficient time is available to carry out the sequence of recording a complete set of seismic waves and then switching the system to a playback mode for production of a monitor record. The present invention is directed to the minimization of equipment for providing a monitor record particularly useful for high data volume operations.

Summary

Data acquisition in digital seismic field recording operations is monitored by applying a plurality of seismic signals by way of a multiplexer and an analog-to-digital converter to a recorder for recording on magnetic tape. Digitized data words recorded on magnetic tape are read from a point spaced from the record point. Signals thus read are applied to the converter and multiplexer. A recording camera is connected to the combination multiplexer-demultiplexer. Switching means operating in synchronism with the multiplexer alternately apply signals from the detectors to the multiplexer and apply signals from said demultiplexer to the camera.

Drawings

The figure illustrates an application of the present invention to a marine seismic operation.

The preferred embodiment

In the figure a marine seismic operation of a continuous character has been illustrated wherein a boat 10 tows a seismic detecting cable 11 which includes a plurality of seismic detectors at space points along its length. The boat 10 has a seismic source 12 associated therewith for generating seismic waves periodically. As the boat 10 moves along a selected course, the source 12 is repeatedly energized as for example, at intervals of 5 seconds or 10 seconds. In the interval following each generation of seismic waves the resultant reflections from subsurface bedding planes are detected by the elements in cable 11 so that a plurality of separate seismic signals are generated and applied by way of cable 13 to a recording system 14.

In general the recording system will be of the type illustrated in U.S. Patent 3,134,957 to Foote et al. The system includes a multichannel amplifier unit 15 with appropriate gain control, a multiplexer 16, an analog-to-digital converter 17, and a magnetic tape recorder 18. Recorder 18 has a write unit 19 connected to the output of the converter 17. The write unit conditions the signals for application to a write head 20.

As described in said Foote et al. patent, the seismic signals are supplied through the multiplexer 16 under the control of a clock 25. The multichannel data applied to the unit 16 is sampled at a selected rate, of for example at 0.002 or 0.004 second intervals. In the system illustrated, 24 detectors are used in the cable 11 thus 24 channels are applied to the unit 16. For convenience, only two of the channels 13a and 13w are illustrated in the figure.

In accordance with the invention, a read head 30 is mounted adjacent to the write head 20. Head 30 is spaced from head 20 a predetermined distance, preferably an integral number of words from the tape 18a plus ½-word interval. The read head 30 is connected by way of channel 31 to a read translator unit 32, the output of which is applied by way of AND gate 33 to the converter 17.

A clock 25 is connected to a register 34 whose output is connected by way of channel 35 to one input of each of AND gates 36 and 37a–37w. A second output of the register 34 is connected by way of channel 38 to AND gate 39 and to each of AND gates 30a–40w. The outputs of the AND gates 30a–40w are connected to a recording camera 41 which is of a type that produces a photographic recording either in wiggle trace form or in some other selected mode. When a control voltage is present on channel 35 the signals from the detectors in cable 11 are applied to the multiplexer unit 16 wherein they are multiplexed and applied by way of gate 36 to the A/D converter 17. The operation is then carried out as described in the Foote et al. patent for storing on tape 18a, in each block of data words, one word from the signal from each of the detectors of cable 11.

Following the writing of each data word a voltage state appears on channel 38 from register 34 whereupon the data word read by the read head 30 is applied by way of a gate 33 to the converter 17 operating in a digital to analog mode and then by way of gate 39 to the demultiplexer 16. The output of the signals from the demultiplexer 16 are applied by way of channels 13aa–13ww to gates 40a–40w and thence to camera 41. Signal conditioning circuits for hold and filtering are contained in camera 41. The camera may be of the type manufactured by SIE of Houston, Tex. and identified as Model No.

VRO-6 or VS-6. Hold and fitting means would be of the type disclosed in said Foote et al patent. Thus, while play-back monitors as described in said Foote et al. patent are normally changed by switching to a play-back mode and allowing the analog-to-digital converter to act in a digital-to-analog mode and the multiplexer to act in a demultiplexer mode, the present invention provides for concurrent write and read operations interlaced through the operation of the control register 34 and the switching gates operating in conjunction therewith. The read head 30 is used to read the data from tape 18a immediately after it is written but delayed by an integer number of data blocks by reason of the magnetic head separation facilitates the operation. Preferably the delay is an integral number of data words plus ½ word. The advantage of this system of time sharing is the elimination of a large amount of hardware for the monitor system were high volume data acquisition does not permit the operation of the type disclosed by the Foote et al. patent. There may be no time for monitoring, as in a conventional play-back mode, because of almost continuous recording in such marine operations. The present invention provides a substantial improvement which is particularly useful in connection with high data acquisition and is fully compatible with and useful in low data acquisition operations.

Having described the invention in connection with certain specific embodiments thereof, it is to be understood that further modifications may now suggest themselves to those skilled in the art and it is intended to cover such modifications as fall within the scope of the appended claims.

What is claimed is:

1. Monitoring system for digital seismic field recording operations wherein a plurality of seismic signals are applied by way of a multiplexer-demultiplexer and a digital-to-analog converter to a recording head for recording on magnetic tape, the combination which comprises:
    (a) a read head adapted to be coupled to said tape at a point spaced from said recording head a predetermined interval,
    (b) means for applying signals from said read head to said converter and thence to said multiplexer-demultiplexer,
    (c) a recording camera connected to said multiplexer-demultiplexer, and
    (d) switching means operating in synchronism with said multiplexer-demultiplexer for alternately applying signals from said detectors to said multiplexer-demultiplexer and for applying signals from said multiplexer-demultiplexer to said camera.

2. The combination set forth in claim 1 in which said multiplexer-demultiplexer and digital-to-analog converter are operable in a reverse direction.

3. The combination set forth in claim 1 wherein said read head is spaced from said recording head an integral number of word intervals on said tape plus one half-word interval.

4. The combination set forth in claim 3 wherein said switching means operates after writing each word on said tape.

5. A system for monitoring the magnetic recording of digitized seismic signals which comprises:
    (a) a converter for the conversion between digital and analog electrical signals representing seismic traces,
    (b) a magnetic member for storage of the digitized representations of said signals,
    (c) a recording head connected to the output of said converter for coupling to said magnetic member for recording said words on said member,
    (d) a clock pulse source synchronized with actuation of said write head to record data words at uniformly spaced intervals along said member,
    (e) a read head coupled between said member and said converter for reproducing data words recorded on said member, said read head being spaced to a predetermined number of data words along said member from said write head,
    (f) means responsive to said clock pulse source for alternately applying signals read from said member to said converter, and
    (g) a camera for recording the read head output of said converter.

References Cited

UNITED STATES PATENTS 3,134,957   5/1964   Foote et al. _____ 340—15.5

RODNEY D. BENNETT, JR., *Primary Examiner.*

C. E. WANDS, *Assistant Examiner.*